(12) United States Patent
Staddon et al.

(10) Patent No.: US 7,865,742 B2
(45) Date of Patent: Jan. 4, 2011

(54) METHOD, APPARATUS, AND PROGRAM PRODUCT FOR ENABLING ACCESS TO FLEXIBLY REDACTED CONTENT

(75) Inventors: Jessica N. Staddon, Redwood City, CA (US); Philippe Jean-Paul Golle, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1054 days.

(21) Appl. No.: 11/611,845

(22) Filed: Dec. 15, 2006

(65) Prior Publication Data

US 2008/0016341 A1 Jan. 17, 2008

Related U.S. Application Data

(60) Provisional application No. 60/807,196, filed on Jul. 12, 2006, provisional application No. 60/807,467, filed on Jul. 14, 2006, provisional application No. 60/807,918, filed on Jul. 20, 2006.

(51) Int. Cl.
*G06F 21/00* (2006.01)

(52) U.S. Cl. ............................. 713/193; 705/76; 380/44

(58) Field of Classification Search .................. 705/76; 713/67; 380/44
See application file for complete search history.

(56) References Cited

U.S. PATENT DOCUMENTS

| | | | |
|---|---|---|---|
| 5,903,646 A | 5/1999 | Rackman | |
| 6,598,161 B1 | 7/2003 | Kluttz et al. | |
| 6,889,205 B1 | 5/2005 | Lamm | |
| 6,931,532 B1 * | 8/2005 | Davis et al. | 713/167 |
| 7,010,681 B1 | 3/2006 | Fletcher et al. | |
| 7,603,553 B1 | 10/2009 | Corbett et al. | |
| 2002/0016777 A1 * | 2/2002 | Seamons et al. | 705/76 |
| 2002/0073313 A1 | 6/2002 | Brown et al. | |
| 2002/0083079 A1 | 6/2002 | Meier et al. | |
| 2002/0103799 A1 | 8/2002 | Bradford et al. | |
| 2003/0091192 A1 | 5/2003 | Chen et al. | |
| 2004/0088313 A1 | 5/2004 | Torres | |
| 2004/0151310 A1 * | 8/2004 | Fu et al. | 380/44 |
| 2005/0108351 A1 | 5/2005 | Naick et al. | |

(Continued)

OTHER PUBLICATIONS

AccessData, Forensic Toolkit. Available on the Internet Dec. 4, 2006 at http://www.accessdata.com/products/ftk/.

(Continued)

*Primary Examiner*—Joseph G Ustaris
*Assistant Examiner*—Kevin Richards
(74) *Attorney, Agent, or Firm*—Fay Sharpe LLP

(57) ABSTRACT

A capability key is generated that provides access to sensitive information within a selectively encrypted data unit created from an unencrypted data unit. A user specifies access rights as a monotone boolean relationship between a selection of a list of attributes related to the unencrypted data unit. This relationship is used to compute a key descriptor. Next one or more shares of a master secret is generated responsive to the monotone boolean relationship and a random number. Next a unique capability key is computed from one or more cryptosystem parameters, the one or more shares and the random number. The unique capability key and the key descriptor together enable decryption of sensitive information within a selectively encrypted data unit created from an unencrypted data unit. Finally, the unique capability key and the key descriptor are provided to allow decryption of sensitive information within the selectively encrypted data unit.

26 Claims, 5 Drawing Sheets

U.S. PATENT DOCUMENTS

| | | |
|---|---|---|
| 2005/0132070 A1 | 6/2005 | Redlich et al. |
| 2005/0138109 A1 | 6/2005 | Redlich et al. |
| 2005/0251514 A1 | 11/2005 | Houle |
| 2006/0075228 A1 | 4/2006 | Black et al. |
| 2006/0259983 A1 | 11/2006 | Sperry |

OTHER PUBLICATIONS

Akl, Selim G., et al., "Cryptographic solution to a problem of access control in a hierarchy", ACM Transactions on Computer Systems (TOCS), vol. 1, Issue 3, Aug. 1983, pp. 239-248.

Attenex Corporation E-Discovery Software. Available on the Internet on Dec. 4, 2006 at http://www.attenex.com/products/eDiscovery.

Asano, Tomoyuki, "A revocation scheme with minimal storage at receivers", Lecture Notes in Computer Science, vol. 2501, Proceedings of the 8th International Conference on the Theory and Application of Cryptology and Information Security: Advances in Cryptology, 2002, pp. 433-450.

Boneh, D., et al., "Identity-Based Encryption from the Weil Pairing", In SIAM J. of Computing, vol. 32, No. 3, 2003, pp. 586-615.

Computing Systems Innovations (CSI). Available on the Internet Dec. 4, 2006 at http://www.csisoft.com/applications/intellidact.php.

Goyal, V., et al., "Attribute-based encryption for fine-grained access control of encrypted data", in the Proceedings of the 13th ACM Conference on Computer and Communications Security, pp. 89-98, Oct. 30, 2006.

nMatrix e-Discovery Services. Available on the Internet Dec. 4, 2006 at http://www.nmatrix.com/e-discovery_services.php.

RenewData. Available on the Internet Dec. 4, 2006 at http://www.renewdata.com/ediscovery-now.php.

Rivest, R.L., et al., "A Method for Obtaining Digital Signatures and Public-Key Cryptosystems", Communications of the ACM, vol. 21, No. 2, 1978, pp. 120-126.

Stratify, Inc, Stratify Legal DiscoveryTM 4.0. Available on the Internet Dec. 4, 2006 at http://www.stratify.com/legal/index.html.

Sweeney, L., "Datafly: A system for providing anonymity in medical data", In Database Security XI: Status and Prospects, 11th International Conference on Database Security, 1997, pp. 356-381.

U.S. Appl. No. 11/202,549, entitled "Document Anonymization Apparatus and Method", filed Aug. 12, 2005.

U.S. Appl. No. 11/282,780, entitled "System and Method For Controlling Access to Personal Identification Information Contained in Documents", filed Nov. 18, 2005.

* cited by examiner

METHOD, APPARATUS, AND PROGRAM PRODUCT FOR ENABLING ACCESS TO FLEXIBLY REDACTED CONTENT

Priority is claimed from U.S. Provisional Application Ser. Nos. 60/807,196 filed Jul. 12, 2006, 60/807,467 filed Jul. 14, 2006, and 60/807,918 filed Jul. 20, 2006, all entitled "Reversible Redaction of Content", by the same inventors and assignee, which are incorporated herein by reference.

CROSS-REFERENCE TO RELATED APPLICATIONS

Cross-reference is made to U.S. patent application Ser. No. 11/611,843 entitled "Method, Apparatus, And Program Product For Flexible Redaction Of Content" and U.S. patent application Ser. No. 11/611,848 entitled "Method, Apparatus, And Program Product For Revealing Redacted Information" that are concurrently filed with this patent application, assigned to the same assignee as this patent application, incorporated in this patent application by reference, and claim priority to U.S. Patent Provisional Application Ser. Nos. 60/807,196, 60/807,467, and 60/807,918.

BACKGROUND AND SUMMARY

The disclosed technology relates to the fields of cryptography and document processing.

There are a number of commercial products for supporting legal discovery. Some products use natural language processing to cluster or categorize and detect cumulative or duplicate documents. These products identify entities within the document. In some products a user then manually selects what entities are to be redacted from the document. Other products can use rules to help redact identified entities and other personal or sensitive information. While these products reduce the time required to produce documents, they still require that the data gatekeeper process the documents to redact sensitive information for which the requesting entity is not authorized. However these tools still require that the data gatekeeper process the documents that contain sensitive information for each discovery request.

Content processing technologies exist to facilitate content indexing and duplicate identification. Technology also exists to redact, or remove, content from documents. The goal of these technologies is to index content, facilitate content search and thus to facilitate removing the searched-for content from the documents.

The existing technology does not allow "in-document" redaction. Either a paper copy or an image of a paper copy is provided that has the sensitive information blocked out. Electronic documents can be redacted by deleting the sensitive information from the file. One of the problems that result from this situation is that because multiple parties have different access rights and because the access rights of the parties change over time, the document owner must carefully control what is redacted based on the access rights. Due to the sheer manual labor and bookkeeping issues involved, mistakes are made. What is needed is some way for documents that contain sensitive information to be provided only once and to have a simple but secure method to reveal the content of the document based on the access rights given to the party.

Another problem that needs to be addressed is that of mistakenly delivering a partially redacted document to the wrong party (such as by a mistake by the post office, or a mailroom error, etc.). Yet another problem is that of attempting to determine which documents in a document collection, or portions of a document, have specific sensitive information.

It would be advantageous to provide a technology that would allow reversible redaction of electronic documents.

In accordance with the disclosure herein, a computer controlled method, apparatus and computer program product therefor, generates one or more capability keys related to an unencrypted data unit. The method includes: selecting one or more attributes from a list of attributes related to the unencrypted data unit; computing a key descriptor responsive to a selection of one or more access rights capable of being represented by a monotone boolean relationship between the one or more attributes; generating one or more random numbers; generating one or more shares responsive to the monotone boolean relationship and responsive to a master secret; generating a unique capability key responsive to one or more cryptosystem parameters, the one or more shares and the one or more random numbers, wherein the unique capability key and the key descriptor together enable decryption of sensitive information within a selectively encrypted data unit created from the unencrypted data unit; and providing the unique capability key and the key descriptor.

DETAILED DESCRIPTION

Figure 1:
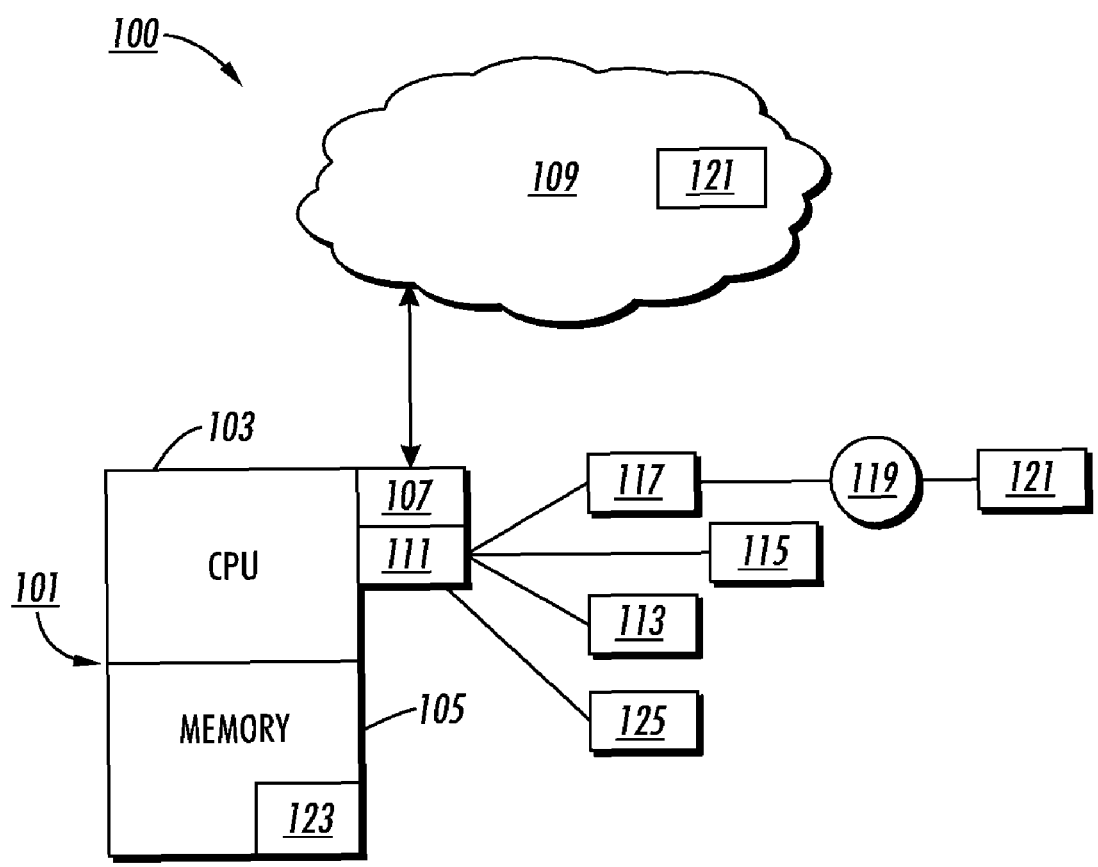
FIG. 1 illustrates a networked computer system in accordance with an embodiment.

This technology addresses a problem that is keenly felt in litigation. Lawsuits often involve multiple discovery requests, each of which requires a time-consuming review of every potentially relevant document to determine which portions disclose sensitive information to be redacted from the document prior to the disclosure of the document. Often the access rights to the sensitive information depend on who is to receive the document. Thus, different sets of sensitive information are redacted depending on the intended recipient of the redacted document. The technology disclosed herein uses encryption to enable reversible redaction. Encryption is used to provide "in-document" redaction of the sensitive content such that each "redacted" document contains all the information of the original document, but with portions of the redacted document's content stored in encrypted form.

Sensitive information can be identified by attribute tags that associate ranges in the document as having a particular set of attributes. For example, the attribute tags may be keywords in the document, or metadata associated with the document such as the name of the document's author or the date the document was created. We refer to these tags as attributes, and the technology disclosed herein as Extended Attribute-Based Encryption (XABE) schemes. In XABE, attributes include the entities, topics, and metadata that can be extracted as a result of linguistic and image-based analysis as well as manually identified sensitive information within a document.

The XABE technology can use a content processing step to semi-automatically identify regions that contain sensitive information for redaction and can apply rules and encryption to generate a "fully" redacted public document. Subsequent requests are satisfied by providing cryptographic keys that can be used with the public document to reveal (or equivalently, decrypt) redacted portions of the public document. Thus, the burden on the data gatekeeper is reduced because the identification of sensitive information only need be done once; and document production for those having different access rights is accomplished by providing the requesting entity with cryptographic keys to enable access to selected sensitive information as per the associated access rights.

Redaction by Encryption: Takes digital data, associated attributes, and rules for redaction, and redacts the sensitive information portions of the digital data by encrypting those portions using the associated attributes in a manner allowing quick access to sensitive information corresponding to particular keywords or topics or other attributes by those authorized to reveal and view the sensitive information.

Automatic analysis of document content: (1) support different models of user interactions when specifying what to redact and (2) support different granularities of items to be redacted. Attributes can be applied to information in a document at the level of words, phrases, sentences, paragraphs, and topics. In addition, the analysis can be computed over a set of documents to identify attributes across documents. The attributes can encode both the "meaning" of the sensitive information as well as sensitive relationships between portions of data.

Entities: As part of entity analysis, the group of words that are aliases of an entity are identified. For example, 'Smith', 'Mr. Smith', 'John Smith', and 'the plaintiff' could all be aliases for one person. In this way, the data gatekeeper could specify that they want to redact 'the plaintiff' in each case without having to explicitly specify who the plaintiff is. Deeper analysis of the relations between terms and the relative location of terms within a document can be performed to identify the aliases. The type of each entity and whether or how the entity may be related to other entities can also be encoded in the tags; this information can then be used in the rules for redaction. For example, '1234 Coyote Lane' can be tagged as a 'street address'; and it may also be identified as being the street address of 'John Smith' who is tagged as a person. A rule can then be specified that the street address of the identified sensitive people should also be redacted, thus allowing specification of sensitive terms with respect to relationships among entities. Alternatively, the data gatekeeper may wish to specify a set of entities of interest. In this case, only aliases and other entities (and their aliases) that are related to the specified entities need to be identified.

The following Appendices provide mathematical descriptions that enable the encryption technology discussed herein:

Appendix A teaches the concepts of an Extended Attribute-Based Encryption (XABE) scheme and provides a security definition.

Appendix B teaches an XABE Scheme based on Secret Sharing.

Appendix C teaches a variant of the XABE Scheme of Appendix B that provides threshold access rights.

Appendix D teaches a variant of the XABE Scheme of Appendix B that provides the ability to revoke users.

The paper *Identity based encryption from the Weil pairing*, by D. Boneh and M. Franklin, in *SIAM J. of Computing*, Vol. 32, No. 3, pp. 586-615, 2003 is hereby incorporated by reference in its entirety as it teaches admissible bilinear maps between groups.

One aspect of the technology disclosed herein relates to a method, apparatus and program product that generate a selectively encrypted data unit from an unencrypted data unit. This is accomplished by accessing a list of attributes related to the unencrypted data unit that identify classifications of sensitive information within the unencrypted data unit. In addition, a protection key that is responsive to a random number is selected and auxiliary values computed from the attributes of the sensitive information and the random number are produced. The sensitive information is encrypted with the protection key to create an encrypted version of the sensitive information. The encrypted version is associated with the auxiliary values and linked to an attribute vector that classifies the sensitive information in the encrypted version. Data from the unencrypted data unit and the encrypted version of the sensitive information is stored as the selectively encrypted data unit.

Another aspect of the technology is related to the generation of a capability key that provides access to sensitive information within a selectively encrypted data unit created from the unencrypted data unit. A user specifies one or more access rights as a monotone boolean relationship between a selection of a list of attributes related to the unencrypted data unit. This relationship is used to compute a key descriptor. Next one or more shares of a master secret is generated responsive to the monotone boolean relationship and a random number. Next a unique capability key is computed from one or more cryptosystem parameters, the one or more shares and the random number. The unique capability key and the key descriptor together enable decryption of sensitive information within a selectively encrypted data unit created from the unencrypted data unit. Finally, the unique capability key and the key descriptor are provided to allow decryption of sensitive information within the selectively encrypted data unit.

Another aspect of the technology is used to reveal sensitive information in a selectively encrypted data unit. The selectively encrypted data unit includes an encrypted version of the sensitive information, a plurality of auxiliary values, and an attribute vector associated with the encrypted version of the sensitive information. The encrypted version of the sensitive information is capable of being decrypted to reveal the sensitive information. The selectively encrypted data unit and a unique capability key are accessed. The unique capability key is associated with a key descriptor and is responsive to one or more cryptosystem parameters, one or more random numbers and one or more shares of a master secret. Next the technology determines whether the attribute vector is filtered or enabled by the key descriptor. If so, a protection key is acquired that is responsive to the one or more cryptosystem parameters, the plurality of auxiliary values, the key descriptor and the unique capability key. Once acquired, the protection key is used to decrypt the encrypted version to generate the sensitive information which is presented.

The technology disclosed herein provides flexible redaction of content, generates a master secret, and associate shares of the master secret with a list of attributes. The list of attributes can be manually, automatically, or semi-automatically determined. The shares are specific to each requesting entity and the selection of attributes for the requesting entity and thus prevent unauthorized users from gaining access to sensitive information through collusion. The shares are stored in encrypted form to ensure that they can only be accessed when a selectively encrypted data unit with the appropriate attributes is received. If the requesting entity receives a selectively encrypted data unit with matching access rights, a protection key (a function of the master secret) can be computed and thus reveal the sensitive information in the selectively encrypted data unit matching the requesting entity's access rights. As part of the decryption process used to reveal the sensitive information, the shares are commingled with the encrypted version of the sensitive information to acquire a protection key. Thus, the protection key used to reveal sensitive information from one encrypted version will not reveal sensitive information from another encrypted version even if the sensitive information is identical.

Appendix A provides a formal overview of a reversible redaction system as well as the security definition for the system. During the Setup Phase, a security parameter, lambda, and a set of attributes are determined from the collection of data units that will be subject to redaction, and are processed to compute cryptosystem parameters (the use of the security parameter lambda is well understood in the art of cryptography and is not further discussed within other than to state that it affects the strength of the encryption). The cryptosystem parameters resulting from the setup phase include public parameters (that can be used as a public key as part of a Public-Private Key pair), and a master key (or other master secret). One skilled in the art will understand that a collection of data units can comprise one or more electronic files. The data gatekeeper generally is responsible for determining the attributes, selecting the one or more electronic files that are included in the collection of data units, and for protecting the master secret. In some embodiments, the master secret is encrypted for storage to help reduce the chance of unauthorized discovery. In some embodiments (such as described in Appendix D), shares are first made of the master secret and one of the shares of the master secret is then further shared. This embodiment allows the data gatekeeper to restrict access of a previously authorized requesting entity to subsequently distributed electronic files. One aspect of this embodiment is that a fixed number "v" of revocation is specified prior to computing the cryptosystem parameters.

The KeyGen Phase, operates on the master secret, a monotone boolean relationship over a list of attributes and the negations of the list of attributes and determines the capability keys. In one embodiment (such as described in Appendix D) this phase operates on a share of the master secret that is allocated to a specified user.

The Encrypt Phase, operates on the cryptosystem parameters, an unencrypted data unit, and a list of attributes associated with the unencrypted data unit. This phase generates a selectively encrypted data unit. In some embodiments (such as described in Appendix D), the encryption process uses a share of the master secret that is responsive to the specified user instead of the master secret itself. This embodiment also uses the list of revoked requesting entities.

The Decrypt Phase, operates on a capability key, a list of attributes, and a selectively encrypted data unit and reveals the sensitive information redacted from the unencrypted data unit. In some embodiments (such as described in Appendix D), the decryption process uses the share of the master secret and uses polynomial interpolation to compute the key used to decrypt selected portions of the selectively encrypted data unit.

The details for one embodiment is provided in Appendix B. A modification of Appendix B is detailed in Appendix C. Appendix C enables the use of a threshold operator when defining the monotone boolean relationship. The threshold operator reduces the number of shares and thus the number of auxiliary values. The threshold operator receives an attribute vector and returns a Boolean value depending on whether the number of attributes in the attribute vector is equal to or exceeds a threshold value. A modification of Appendix B is detailed in Appendix D and allows revocation of previously authorized requesting entities.

The disclosed technology allows an unencrypted data unit or a collection of data units (such as one or more electronic documents in a document collection) to be redacted once by the data gatekeeper, allows the resulting selectively encrypted data unit(s) to be made publicly available, and allows the data gatekeeper to subsequently specify which portions of the selectively encrypted data unit(s) are to be revealed to a requesting entity based on the attributes associated with the selectively encrypted data unit(s). The sensitive information in the unencrypted data unit is encrypted, the encrypted version used to replace the sensitive information in the resulting selectively encrypted data unit(s). Subsequently, authorized requesting entities can receive keys that will reveal some or all of the encrypted portions of the selectively encrypted data unit(s). In addition, the selected requesting entities can also be given additional keys to reveal a larger selection of the redacted portions of the selectively encrypted data unit. Thus, using an example of a document collection as a collection of data units, the document collection can be processed once to redact sensitive information, and the redacted documents can be publicly distributed. Subsequent requests to access the sensitive information can be satisfied by the data gatekeeper providing the requesting entity with keys to reveal (un-redact, decrypt) those encrypted portions of the redacted document that the requesting entity has been authorized to access.

There are certain to be instances in which it is necessary to block the access of rogue requesting entities to new documents introduced to the system. The embodiment of Appendix D is an extension to the embodiment disclosed by Appendix B that allows revocation of previously authorized requesting entities and that incurs no additional user storage.

Some embodiments of the technology enable logging of content access. For example, the protection key need not be stored inside or with the selectively encrypted data unit, even in encrypted form. Rather, the requesting entity can recover an access key (instead of a protection key) from the unique capability key and the key descriptor (using the same techniques used to recover the protection key). The access key then can be presented to a trusted third party to prove to the trusted third party that the requesting entity is authorized to access the sensitive information. The requesting entity then receives the appropriate protection key for the sensitive information from the trusted third party. The trusted third party can log that the requesting entity viewed the particular content after providing the protection key. The communications between the requesting entity and the trusted third party can be protected using known secure communication technologies.

FIG. 1 illustrates a networked computer system 100 that can incorporate an embodiment. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include a display device 125 and user input devices (not shown). The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, is a computer-usable data carrier. One skilled in the art will understand that not all of the displayed features of the computer 101 need to be present for all the embodiments that implement the techniques disclosed herein.

Mathematical descriptions of the processes used by the disclosed technology are provided in the appendices. These descriptions will enable one skilled in the art of cryptography to practice the technology without undue experimentation. A list associating some of the symbols with the terms used herein is:

d≡a capability key;
e≡an admissible bilinear map;
G, G', e≡two groups and an admissible bilinear map between them as is understood by one skilled in the art of cryptography;
g≡a randomly selected generator in G;
$h_0 \equiv e(g,g)^s$;
Cryptosystem parameters≡G, g, $h_0$, $g_1$, . . . ,$g_m$;≡G,g,n, m, v;
λ≡a security parameter as is understood by one skilled in the art of cryptography;
l≡a threshold number of attributes;
k≡the number of elements in T;
M≡a subset of sensitive information;
p≡a polynomial of degree v+m; where m is the number of attributes, v is the number of possible revocations, and p(0) is equal S;
q(x)≡a polynomial of degree l−1 over {1, . . . ,|G|−1};
r'≡a protection key;
R≡a subset of U that have had their access revoked;
S=mk≡a master secret;
$s_i$≡one of a set of shares;
T≡list of attributes of sensitive information;
σ≡monotone Boolean relationship over elements of W;
u,$v_j$≡auxiliary values;
$U_1$. . .$U_n$≡list of requesting entities who will have access;
$u_1$. . .$u_n$≡list of unique numbers each of which is associated with a point on p corresponding to a specific U;
v≡maximum number of possible revocations of authorized requesting entities;
W≡a list of attributes; and
w≡a specific attribute of W within T for the Setup and KeyGen phases, for the encryption and decryption phases the ciphertext of M.

Figure 2:
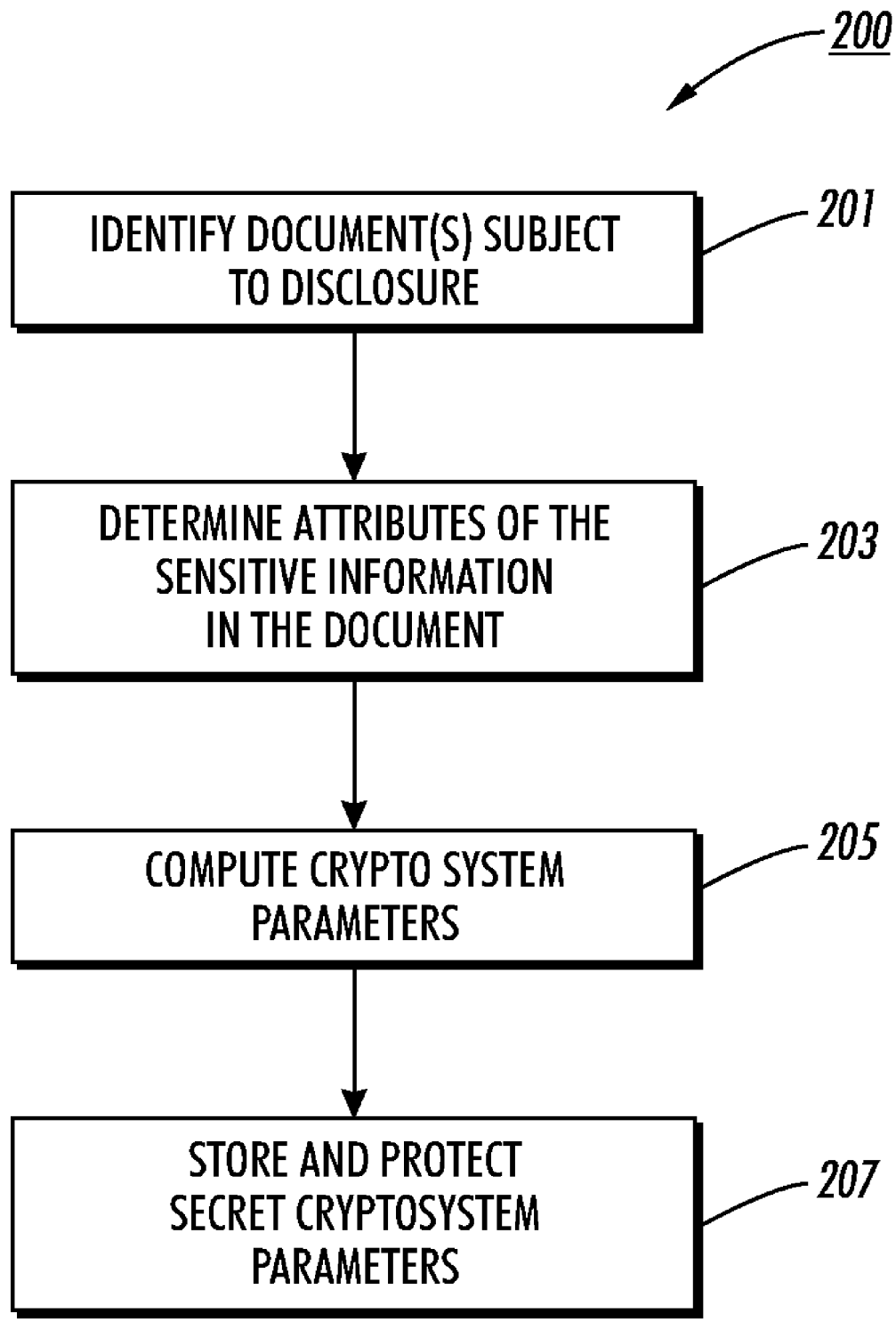
FIG. 2 illustrates a redaction setup process.

FIG. 2 illustrates a redaction setup process 200 that creates cryptosystem parameters for use with the KeyGen phase, the Encrypt phase, and the Decrypt Phase. An 'identify document(s) subject to disclosure' process 201 first assembles the data that contains sensitive information and makes this data electronically accessible as unencrypted data units. In the litigation environment, the 'identify document(s) subject to disclosure' process 201 includes locating and classifying existing electronic documents such as computer files and electronic mail as well as scanning paper documents into new electronic documents. A 'determine attributes of sensitive information' procedure 203 that can use automated processes, manual processes, or some combination thereof to classify portions of the data within the electronic data units as sensitive information. A 'compute cryptosystem parameter' procedure 205 computes a master secret, and the cryptosystem parameters for the type of XABE. Thus, the Setup Phase can be different between the XABE types. A 'save cryptosystem parameters' procedure 207 can then save the cryptosystem parameters for use in subsequent Phases.

For the embodiment of Appendix D, the number of potentially revoked, previously authorized requesting entities is fixed. The data gatekeeper specifies a number for v large enough to handle a reasonable number of revocations, but not so large as to significantly impact the responsiveness of the decryption process due to the increased computation required by the decryption phase. The cryptosystem parameters for the embodiment of Appendix D include v, n, and m: the master secret can be considered to be a set of shares of a secret.

Figure 3:
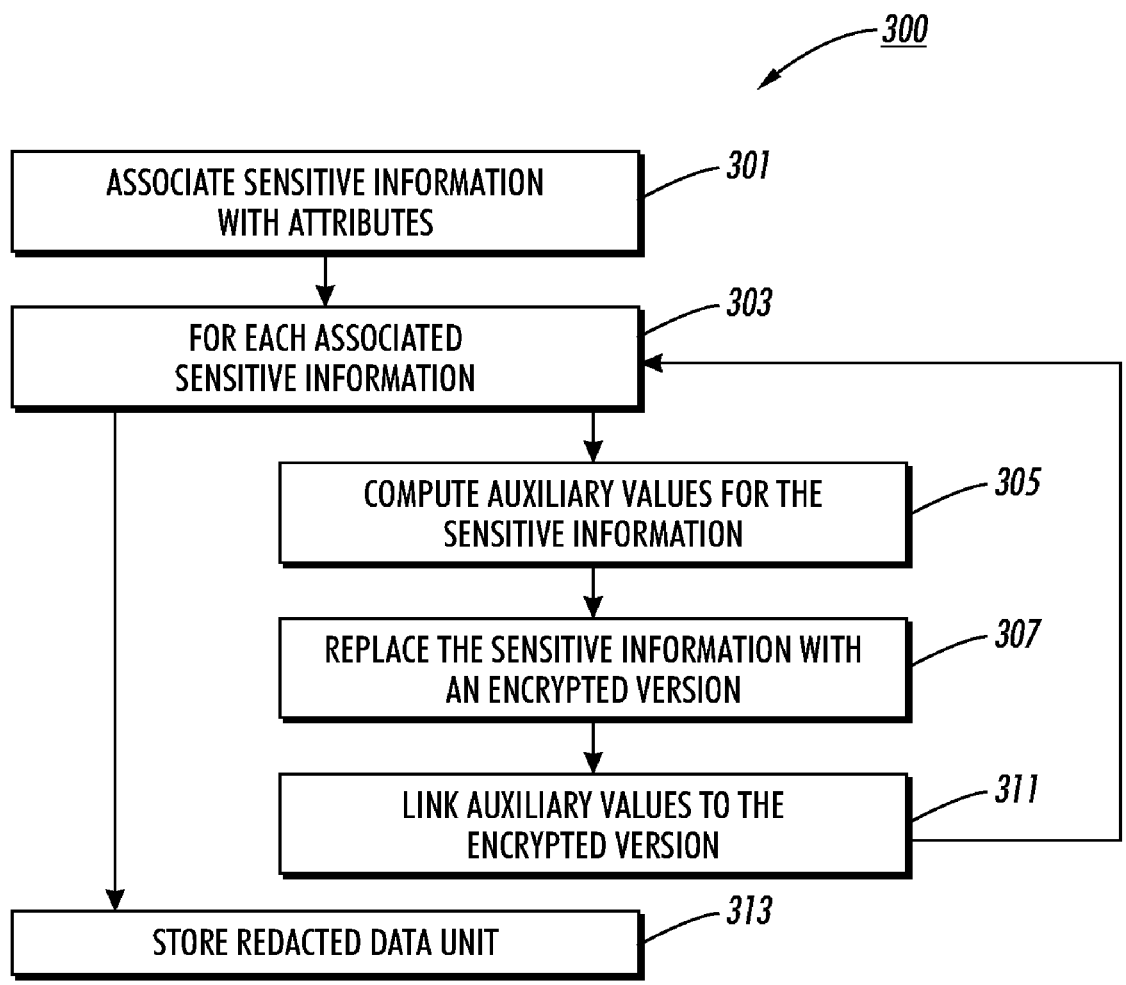
FIG. 3 illustrates an information redaction process.
Figure 4:
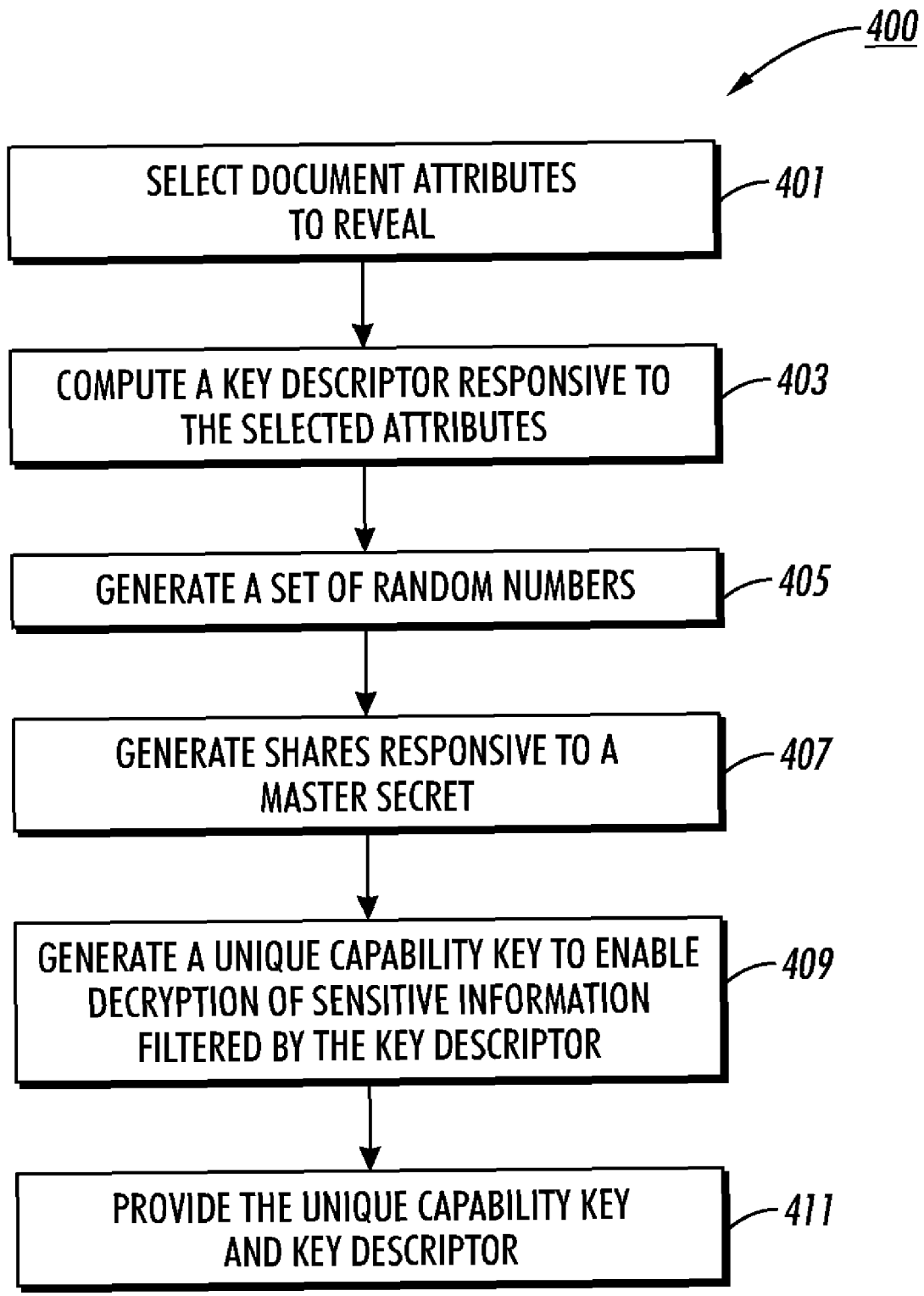
FIG. 4 illustrates a key generation process.
Figure 5:
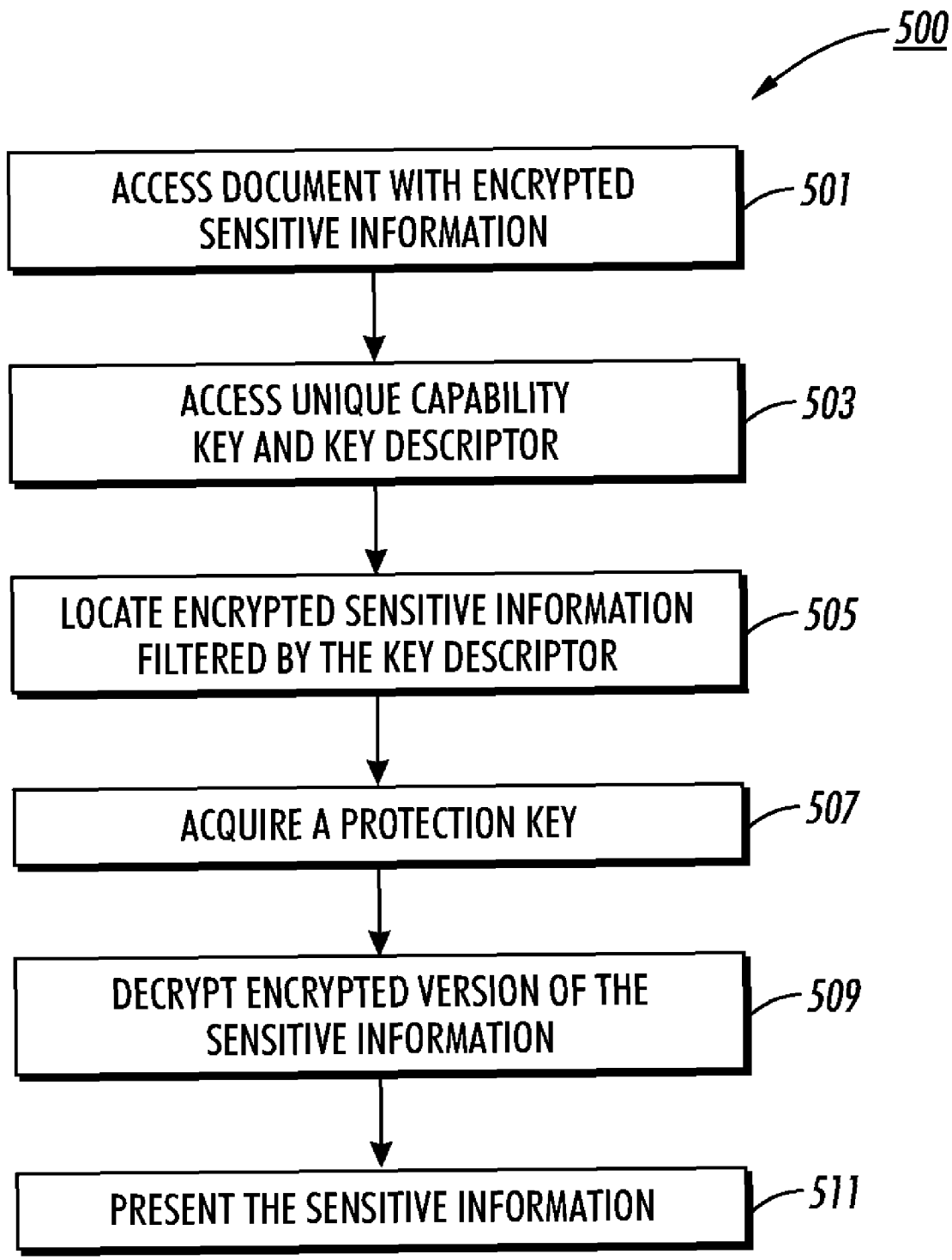
FIG. 5 illustrates a reveal redacted information process.

The cryptosystem parameters can be accessed by the processes shown in FIG. 3, FIG. 4, and FIG. 5. These cryptosystem parameters can include data used as a public key (as disclosed in Appendix B, Setup Phase) as well as the master secret for the selectively encrypted data unit(s) or collection of data units. The data gatekeeper can provide the public cryptosystem parameters in the same manner as the unique capability key and the key descriptor are provided. In addition, the data gatekeeper can provide the public cryptosystem parameters via a web server, or other networked data share.

Data units (generally one or more electronic files) can be added to a collection of data units. Often the collection of data units is a document collection that can contain electronic files such as scanned document image data, audio data, video data, graphical data, personally identifiable data, image data, and textual data and the like. Much of the technology described herein is directed toward a document collection as an example of such a collection of data units.

In the document collection embodiment, the 'determine attributes of sensitive information' procedure 203 can examine a single document, or can examine documents in the collection of data units to determine a list of attributes used to classify sensitive information in the unencrypted data unit. These attributes can include but are not limited to personally identifiable data, one or more restricted numbers, one or more restricted topics, one or more metadata values, one or more text characteristics, one or more identified ranges of restricted data, or one or more restricted images. The metadata values can be, for example but without limitation, document metadata such as creation date, filename, title, modification date, version, author, or the like. The text characteristic values can include, for example but without limitation, italic, bold, hidden, color, highlighting, typeface, size of range, etc. The 'determine attributes of sensitive information' procedure 203 operation can be manual, automatic, or a mixture thereof. Attributes can categorize any sensitive information or information that can be used to infer sensitive information.

In some embodiments, attributes are associated with the data containing the sensitive information during the 'determine attributes of sensitive information' procedure 203, other embodiments associate the data with the attributes during the encryption process disclosed by FIG. 3 and associated text. Each sensitive information portion of the data will be characterized by an attribute vector that indicates which of the list of attributes are associated with the sensitive information. The linkage of the attribute vector with the sensitive information can be accomplished by storing the attribute vector near the encrypted version, storing the attribute vector at a specified location within the unencrypted data unit, storing the attribute vector as metatext, storing the attribute vector in a second file unit, storing the attribute vector in a database and storing the attribute vector for access through a server computer, etc. In some embodiments, the attribute vector can be a compressed Boolean array indicating which of the list of attributes are true with respect to the sensitive information.

One skilled in the art will understand that there are a plethora of approaches that will associate an attribute with data ranges in the collection of data units that are considered to be sensitive information.

FIG. 3 illustrates one embodiment of an 'information redaction' process 300 that starts with an 'associate sensitive information with attribute' process 301 identifying sensitive information in one or more data units and associating the sensitive information with attributes (if such identification and association was not made during the setup process as described with respect to FIG. 2, or if the data unit was added to the collection of data units after execution of the setup process). A 'for each associated sensitive information' iterative procedure 303 then iterates each portion of the data unit(s) that contains sensitive information and computes an attribute vector for each attribute in the list of attributes that applies to the iterated sensitive information (if the attribute vector was not already defined during the redaction setup process 200). The attribute vector can include information to help locate the ranges, the words, sentences, paragraphs, pages, or other portions of the unencrypted data unit that disclose the sensitive information associated with the attribute(s) in the attribute vector. As each sensitive information is iterated, a 'compute auxiliary values' procedure 305 computes auxiliary values that will be used to compute a protection key for the encrypted version of the sensitive information (or compute an access key to be submitted to a trusted third party who will provide the required protection key). The auxiliary values are a function of the attribute vector itself (which does not expose or use the actual attributes), the public key from the cryptosystem parameter and the random number used to encrypt the sensitive information.

One skilled in the art will understand that a data access logic and an attribute access logic can be invoked as part of the 'associate sensitive information with attribute' process 301. Such a one will also understand that a data selection logic can be invoked as part of the 'for each associated sensitive information' iterative procedure 303; and that a key selection logic and a first value generation logic can be invoked by the 'compute auxiliary values' procedure 305.

One skilled in the art will understand that each separate occurrence of the sensitive information, even if identical to another occurrence will have different auxiliary values and that each occurrence will have its own protection key because each sensitive information is encrypted with a different random number.

A trusted third party can be used to log accesses to the sensitive information. In one embodiment, the data gatekeeper provides a pair of keys (the access key and the protection key) such that when the trusted third party receives an access key it returns the associated protection key. In another embodiment the data gatekeeper provides the trusted third party with a copy of the master secret such that when the trusted third party receives an access key the trusted third party can compute a protection key from the access key and the master secret that can then be returned. The protection key and the access key can be securely provided to the trusted third party (and this functionality can be incorporated into the 'replace sensitive information with encrypted version' procedure 307). The requesting entity, as part of the decryption process determines the access key, sends the access key to the trusted third party who then securely sends the protection key that corresponds to the access key to the requesting entity who uses the protection key to reveal the sensitive information. These secure communications can use the network 109 to access the trusted third party. The trusted third party can maintain records of successful and unsuccessful requests from requesting entities.

A 'replace sensitive information with encrypted version' procedure 307 then replaces the sensitive information with the encrypted version of the sensitive information. A 'link auxiliary values to encrypted version' procedure 311 associates the auxiliary values with the encrypted version of the sensitive information. When all of the sensitive information is processed, a 'store selectively encrypted data unit' procedure 313 stores the selectively encrypted data unit. The selectively encrypted data unit(s) can then be publicly distributed.

For the electronic document embodiment, the selectively encrypted data unit is a redacted document. Those without keys can read only non-sensitive information while those with keys can, in addition, read the sensitive information enabled by those keys.

Some embodiments store the auxiliary values with the attribute vector; other embodiments store the auxiliary values with the encrypted version of the sensitive information. One skilled in the art will understand that a plethora of equivalent techniques exist to associate the auxiliary values with the encrypted version. Furthermore, such a one will understand that the attribute vector need not contain or reference the attributes themselves, but rather it just indicates that whatever attribute is represented by any given element in the vector is, or is not, present in the sensitive information.

A 'replace sensitive information with encrypted version' procedure 307 computes or selects a random number and generates a protection key responsive to the random number, computes auxiliary values as a function of the attribute vector and the random number, and encrypts the sensitive information using the protection key to create an encrypted version of the sensitive information. The encrypted version is associated with the auxiliary values by the 'link auxiliary values to encrypted version' procedure 311. Then the sensitive information is replaced by the encrypted version. The details for this computation are in Appendix B, Appendix C and/or Appendix D at the Encrypt Phase. For the embodiment of Appendix D, the encrypted version is generated responsive to, at least, the revoked requesting entities. The 'replace sensitive information with encrypted version' procedure 307 can use an encryption logic to encrypt the sensitive information and the 'link auxiliary values to encrypted version' procedure 311 can use a vector association logic.

In the situation where the unencrypted data unit is an electronic file that contains textual data, the 'replace sensitive information with encrypted version' procedure 307 creates a ciphertext version of the cleartext in the region containing the sensitive information and then replaces the cleartext with the encrypted version of the sensitive information together with, or separately from the auxiliary values.

The 'store selectively encrypted data unit' procedure 313 can then store, as a selectively encrypted data unit, the unencrypted data from the unencrypted data unit with the sensitive information replaced by the encrypted version of the sensitive information as well as links or other associations between attribute vectors, auxiliary values, etc. The 'store selectively encrypted data unit' procedure 313 can invoke a storage logic.

In the document example, the collection of data units is a document collection, the unencrypted data unit is an electronic document, the sequence of data is a cleartext string (for example, the text that represents the entire document, or portion of the document, etc.), the sensitive information is a subset of the cleartext string, the encrypted version is ciphertext of the sensitive information, and the selectively encrypted data unit is a redacted electronic document. The selectively encrypted data unit can contain both cleartext and ciphertext portions. The ciphertext portions are associated with attribute vectors that enable identification of particular ciphertext that can be revealed using a unique capability key that is associated with a key descriptor. The key descriptor and the attribute vectors are used to select which of the ciphertext portions can be decrypted by the unique capability key. The same process can be applied to data units such as databases, spreadsheets, etc. In some embodiments, the key descriptor can have the same structure as an attribute vector (including being a compressed Boolean array). In other embodiments the key descriptor can be used by a Boolean formula to filter which of the ciphertext portions can be decrypted by the unique capability key. In yet other embodiments the key descriptor can include a Boolean formula that filters attribute vectors.

Each selectively encrypted data unit contains the encrypted version of the sensitive information and the auxiliary values associated with that encryption. The auxiliary values can be stored with the associated encrypted version, can be stored in a dictionary within or associated with the selectively encrypted data unit, or otherwise associated with the encrypted version of the sensitive information.

One skilled in the art will understand that the sensitive information can be randomly padded prior to encryption to increase the difficulty of making correct inferences based on the size of the encrypted version about the sensitive information.

In some embodiments, the unencrypted data unit can include scanned document image data, audio data, video data, graphical data, personally identifiable data, image data, and textual data.

Some embodiments compute a protection map (such as a dictionary, hash, array, etc.) to assist in locating the sensitive information within said selectively encrypted data unit.

Once the collection of data units has been processed to redact sensitive information as described above, the data units can be redistributed to others who will have access to the un-redacted portions of file, but will not have access to the sensitive information.

In an embodiment where the unencrypted data units are electronic documents, the selectively encrypted data unit can be delivered with a program or word processing macro to locate and preprocess the encrypted version of the sensitive information to assure that the particular word processing program properly displays the non-encrypted text. The program/macro can, given the correct keys, also present the sensitive information.

To enable others to access the sensitive information, a unique key is prepared for each requesting entity. A data gatekeeper can select which sensitive information is to be revealed to the requesting entity by specifying access rights to a selected combination of the list of attributes associated with the collection of data units such that if the sensitive information satisfies the access rights the sensitive information will be decrypted for the requesting entity. The data gatekeeper specifies the access right as a Boolean relationship between the list of attributes (either formulaic or as a textual description, or through the use of a user interface). Some embodiments maintain a database of the list of attributes and use database access tools to determine which of the list of attributes will be used in the Boolean relationship.

FIG. 4 illustrates a key generation process 400 that can be used to generate one or more capability keys related to a data unit and/or a collection of data units. The data gatekeeper, after receiving a request from a requesting entity for access to the sensitive information within the selectively encrypted data unit, and after verifying that the requesting entity's access has been authorized, generates a unique capability key and a key descriptor for the requesting entity using the key generation process 400. A 'select attributes' procedure 401 allows the data gatekeeper to provide access rights to a requesting entity for sensitive information by specifying a Boolean relationship of the list of attributes related to the collection of data units. The 'select attributes' procedure 401 can invoke an attribute logic. A 'compute key descriptor' procedure 403 receives input from the data gatekeeper that specifies one or more access rights. The one or more access rights are input as a monotone boolean relationship (or equivalent) between the one or more attributes associated with the collection of data units. The 'compute key descriptor' procedure 403 can invoke a key descriptor generation logic. One skilled in the art will understand that a monotone boolean relationship is one that is a Boolean formula on variables and their negations that uses only the Boolean operators AND and OR (and in some embodiments, a threshold operator).

The monotone boolean relationship can be specified as a formal Boolean construction, as an equivalent plain text representation of the formal Boolean construction, as a Venn diagram, or other logic specification known to one skilled in the art. The data gatekeeper can provide the input in any manner known to one skilled in the art. The monotone boolean relationship is used to compute a key descriptor that is responsive to the access rights given to the requesting entity. The key generation process 400 also generates a set of cryptographically random numbers using a random number generator at a 'generate random number set' procedure 405 that will be applied to each share as represented by the leaves of a decision tree represented by the monotone boolean relationship.

A 'generate shares responsive to master secret' procedure 407 generates shares of the master secret responsive to the monotone boolean relationship and can invoke a share generation logic.

A 'generate unique capability key' procedure 409 then computes a unique capability key responsive to the cryptosystem parameters (that were computed during the setup phase), the key descriptor, and the shares. The 'generate unique capability key' procedure 409 can invoke a key generation logic. The key descriptor can be used with the attribute vectors to determine which of the encrypted versions of sensitive information within the collection of data units can be revealed or decrypted by the key descriptor. A 'provide key information' procedure 411 (a provision logic) then provides the capability key and the key descriptor to the requesting entity. The capability key and the key descriptor can be encrypted with a public key associated with the requesting entity. The key descriptor can be separately stored by the data gatekeeper to enable reconstruction of the access allowed to the requesting entity. The data gatekeeper also provides or makes available to the requesting entity the public cryptosystem parameters used in generating the capability key and the key descriptor. In the embodiment of Appendix D, the key generation process 400 is responsive to the requesting entities.

One skilled in the art after reviewing Appendix B in light of this specification will be able to practice this aspect of the technology without undue experimentation.

In some instances, the requesting entity may be subsequently authorized for access to additional information in the collection of data units. In this circumstance the data gatekeeper specifies a different selection of attributes as has been previously described and issues a new capability key and key descriptor to the requesting entity.

In some embodiments (such as described by Appendix C) at least one of the one or more access rights can be specified as a threshold relationship of the one or more attributes from a subset of the one or more attributes. In such embodiments the 'generate shares responsive to master secret' procedure 407 includes procedures for selecting a random polynomial of degree l–1 responsive to the master secret such that the selected polynomial identifies the master secret at coordinate 0 and such that the one or more shares can be represented as points on the selected polynomial. The threshold relationship can be expressed as a monotone relationship and a threshold operator can operate on the key descriptor and the attribute vector to determine whether a threshold number of attributes exist in the attribute vector of the attributes in the key descriptor.

FIG. 5 illustrates a reveal redacted information process 500 that allows a requesting entity to reveal some of the redacted information within a selectively encrypted data unit as authorized by a unique capability key and a key descriptor. The selectively encrypted data unit results from a process substantially similar to that described with respect to FIG. 3. The unique capability key and the key descriptor are generated and provided to the requesting entity from a process substantially similar to that described with respect to FIG. 4. The selectively encrypted data unit includes an encrypted version of sensitive information, auxiliary values, and an attribute vector. The elements of the attribute vector specifies which of a list of attributes for the collection of data units are associated with the sensitive information. The encrypted version of the sensitive information is capable of being decrypted using the unique capability key and the key descriptor. The selectively encrypted data unit can also include a sequence of non-encrypted data.

The reveal redacted information process 500 accesses the selectively encrypted data unit at an 'access selectively encrypted data unit' procedure 501 and also accesses the unique capability key, the key descriptor, and cryptosystem parameters provided by the data gatekeeper at an 'access capability key and key descriptor' procedure 503.

A 'locate encrypted sensitive information' procedure 505 then uses the key descriptor to filter which encryptions of sensitive information can be decrypted and revealed to the requesting entity. One embodiment accesses a protection map to quickly determine the locations of the encrypted version of the sensitive information within the selectively encrypted data unit.

Once an encrypted version of the sensitive information is selected, an 'acquire protection key' procedure 507 can determine a protection key using the one or more cryptosystem parameters, the plurality of auxiliary values, the key descriptor and the unique capability key in accordance with the mathematics detailed at the Decrypt Phase of Appendix B, Appendix C, or Appendix D. Once the protection key is computed, a 'decrypt encrypted sensitive information' procedure 509 decrypts the encrypted version to reveal (generate) the sensitive information.

Once the sensitive information is decrypted, a 'present sensitive information' procedure 511 can replace the encrypted version in the selectively encrypted data unit, can create a result file where the decrypted sensitive information replaces the corresponding encrypted versions, can print or display the decrypted sensitive information, etc.

Some embodiments compute the 'acquire protection key' procedure 507 using computing resources controlled by the requesting entity. Other embodiments recover an access key instead of the protection key using the mathematics detailed at the Decrypt Phase of Appendix B, Appendix C or Appendix D. The access key is then provided to a trusted third party who returns the protection key as has been previously described. In the embodiment of Appendix D, the generation of the access key requires that the authorization for the requesting entity not be revoked. In Appendix D, a polynomial interpolation uses cryptosystem parameters, auxiliary values, the key descriptor and the unique capability key to recover the polynomial at the origin. The polynomial interpolation is calculated using values where the polynomial is interpolated. These values can be obtained from any one or combination of the one or more cryptosystem parameters, the key descriptor or the unique capability key.

In the document example, the unencrypted data unit is an electronic document, the encrypted version is ciphertext, and the selectively encrypted data unit is a redacted electronic document.

One aspect of the technology disclosed herein is that of encrypting sensitive information of a collection of data units. Encrypting sensitive information in the collection of data units includes, but is not limited to, encrypting portions of one or more documents in a document collection. The techniques disclosed herein can also be applied to a single unencrypted data unit as well as to unencrypted data units within a collection of data units.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination. In particular one skilled in the art after reading this specification and appendices would understand how to implement, without undue experimentation, each of the attribute access logic, the attribute filter logic, the attribute logic, the attribute storage logic, the data access logic, the data analysis logic, the data selection logic, the decryption logic, the directory logic, the encryption logic, the first value generation logic, the key access logic, the key acquisition logic, the key descriptor generation logic, the key generation logic, the key preparation logic, the key selection logic, the network logic, the presentation logic, the receiver logic, the second value generation logic, the share generation logic, the storage logic, the transmission preparation logic, the provision logic, the interpolation logic, the threshold logic and the vector association logic in software, in hardware, or in some combination. One skilled in the art is one who is skilled in the mathematics of and computer implementations of cryptography.

One skilled in the art will understand that the network transmits information (such as informational data as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology provides a very flexible and convenient process for selectively redacting content from electronic documents such that the redacted content can be selectively revealed.

From the foregoing, it will be appreciated that the technology has (without limitation) the following advantages:
1) "In-document" redaction: A single file containing all of its original content can be provided with the assurance that only authorized portions of the original content will be visible to the user. Thus, security stays with the file even when the file is made public (thus, a mis-routed or lost file remains protected).
2) Usability: Changes to a user's access rights only requires that a new key descriptor and unique capability key are provided to the user instead of the entire file or of an individually redacted file. Anyone can access and use data unit content for which they are authorized.
3) Fine-grained, content-driven access control: Ensures that users cannot view data pertaining to certain keywords or events, independent of what particular data unit the user examines. Thus, changes in the user base do not require access control changes as required when access is user-based.
4) Efficient location and recovery of content from a collection of data units: Allows authorized users to extract information about which data units contain certain content and where that content is within the data units and/or the collection of data units.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

Appendices A-D follow:

Appendix A

Let $T \subset W$, and let $\sigma$ be a boolean formula over the variables $w_1, \ldots, w_m$ and their negations. We say that T satisfies $\sigma$ if $\sigma$ is satisfied when the variables in T are set to true and the variables in the complement of T are set to false.

Definition 1 An XABE scheme consists of four algorithms:

Setup($\lambda$, W) takes as input a security parameter $\lambda$ and a set of attributes $W=\{w_1, \ldots, w_m\}$, and outputs the public parameters and a master key, (pub, mk). The set W must be part of the public parameters.

KeyGen(mk, $\sigma$) takes as input a master key mk and a monotone boolean formula $\sigma$ over the variables $w_1, \ldots, w_m$ and their negations $\overline{w_1}, \ldots, \overline{w_m}$, and outputs secret parameters $d_{94}$.

Encrypt(mk, M, T) takes as input a master key mk, a message M, and a subset $T \subset W$ of the attributes that take the value true in the message M, and outputs a ciphertext C.

Decrypt($T, d_\sigma, C$) takes as input a set of attributes $T \subseteq W$, a secret key $d_\sigma$ corresponding to a boolean formula $\sigma$ and a ciphertext C, and outputs a message or a special symbol $\bot$. such that if T satisfies $\sigma$, then we have Decrypt($T, d_\sigma$, Encrypt($mk, M, T$))=$M$.

Informally, an XABE scheme is secure if a user can only decrypt portions of documents that satisfy the boolean formula that describes the access rights of the user. Formally, we define the security of an XABE scheme through the following game between an adversary and a challenger:

Setup: the challenger runs the Setup algorithm, gives the public parameters to the adversary and keeps the master key to himself.

Phase 1: the adversary adaptively issues queries $\sigma_1, \ldots, \sigma_m$, where each $\sigma_i$ is a boolean formula over the variables in W and their negations. The challenger responds by running the KeyGen algorithm and gives the secret key $d_{\sigma_i}$ corresponding to $\sigma_i$ to the adversary. In addition, the adversary adaptively issues encryption requests for a message M and attribute set T. The challenger responds by running Encrypt and gives the resulting ciphertext C to the adversary.

Challenge: the adversary outputs two equal length messages $M_0$ and $M_1$, and a subset $T^*$ of W such that $T^*$ satisfies none of the boolean formulas $\sigma_i$ issued in Phase 1. The challenger picks a bit $b^R \leftarrow \{0,1\}$, encrypts C→Encrypt(mk, $M_b$,T) and outputs C.

Phase 2: the adversary adaptively issues queries $\sigma_{m+1}, \ldots, \sigma_n$ such that $T^*$ does not satisfy $\sigma_i$ for $m+1 \leq i \leq n$. The challenger answers these queries as in Phase 1.

Guess: the adversary outputs a bit b'.

We define the advantage of the adversary in attacking the scheme as $$Adv_A(\lambda) = \left| Pr[b = b'] - \frac{1}{2} \right|$$

The ABE scheme is secure if the adversary's advantage is negligible. We prove the security of the XABE schemes proposed in Appendices B and C in the selective-set model. Specifically, we assume that the set $T^*$ is given by the adversary at the beginning of the game, before he receives the public key. We note that schemes secure against selective attacks are also secure against adaptive attacks, with a loss of $2^m$ (where m is the number of keywords) in the efficiency of the reduction.

Appendix B

The user access rights are described by boolean formulas $\sigma$ on the attributes, represented by a rooted tree in which each internal node is either an AND or an OR gate, and the leaves are keywords. We say that a leaf $w_i$ is satisfied by a set of attributes T if $w_i \in T$, an AND node is satisfied if all its children are satisfied and an OR node is satisfied if one of its children is satisfied. The tree $\sigma$ is satisfied if the root is satisfied. If user U is given access $\sigma_U$, then he should be able to read every document D whose set of attributes $T_D$ satisfies $\sigma_U$.

Setup($\lambda$, W): Say $W=\{w_1, \ldots, w_m\}$. Let G and G' be groups and let e: $G \times G \rightarrow G'$ an admissible bilinear map. Select a random generator $g \in G$ and a random integer $S \in \{0, \ldots, |G|31\, 1\}$. Compute $h_0 = e(g;g)^S$, and select $g_1, \ldots$ $g_m \xleftarrow{R} G$.

The values $g_1, \ldots, g_m$ will be associated with attributes $w_1, \ldots, w_m$. The public key is $(G,g,h_0,g_1,\ldots,g_m)$, the master key is mk=S.

KeyGen(mk, σ): First assign the secret value S to the root of the tree. Then, values are assigned to all the nodes in the tree recursively as follows:

if an OR gate is assigned secret value s, assign the secret value s to all its children.

if an AND gate with k children is assigned secret value s, generate k−1 random values $$s_1, \ldots, s_{k-1} \xleftarrow{R} \{1, \ldots, |G|-1\}$$

and set $s_n = s - \Sigma_{i=1}^{k-1} s_i \bmod |G|$ and assign a secret value $s_i$ to each children. When this is done, a key is associated with each leaf of the tree: a leaf with keyword $w_i$ assigned secret value s is associated with a key $(d_0=g^r, d_1=g^s \cdot g_i^r)$ where $r^R \leftarrow \{1, \ldots, |G|-1\}$ (different r for each leaf). The secret key $d_\sigma$ associated with σ is the set of secret keys associated with all the leaves of σ.

Encrypt(mk,T,M): Select $$r' \xleftarrow{R} \{0, \ldots, |G|-1\}.$$

Compute $u=g^{r'}$, $v_j=g_j^{r'}$ for $w_j \in T$ and $w=h_0^{r'} \cdot M$.
Return $C=(u, v_j\}w_j \in T, w)$.
Decrypt(T, $d_\sigma$,C): Say $C=(u,\{v_i,w_i \in T, w)$.

For each leaf in σ that is satisfied by T, associate $h=e(u,d_1) \cdot e(v_i,d_0)^{-1}$ to the leaf, where $(d_0,d_1)$ and $w_i$ are respectively the secret key and the keyword associated with the leaf (note that $e(u,d_1) \cdot e(v_i,d_0)^{-1} = e(g,g)^{rs}$ where $r=\log_g u$ and s is the value associated with the leaf by the KeyGen algorithm). Then, associate a group element each node in ma that is satisfied by T in a bottom-up fashion as follows:

if h is associated with one child of an OR node, associate h with the OR node as well.

if $h_1, \ldots, h_k$ are associated with each of the k children of an AND node, associate $h=\Pi_{i=1}^k$ to the AND node.

At the end of this process, the value $h=e(g,g)^{r'S}=h_0^{r'}$ will be associated with the root of σ (where $r'=\log_g u$). We can then compute $M=w \cdot h^{-1}$.

Appendix C

Setup (λ, W): The same as before.
KeyGen(mk, σ): Let S be the master secret, and let $W_1, \ldots, W_k$ represent the attributes in σ. Recall, user U has access to any document or document region with e attributes in the set, $W_1, \ldots, W_k$. Let q(x) be a polynomial of degree e−1 over $\{1, \ldots, |G|-1\}$ and let $a_1, \ldots, a_e \in \{1, \ldots, |G|-1\}$ be distinct elements. Finally, let $$r \xleftarrow{R} \{1, \ldots, |G|-1\}.$$

The secret key, $d_\sigma$, is $g^r$, $g^{q(a_1)} \cdot g_1^r, \ldots, g^{q(a_k)} \cdot g_k^r$, where $g_i$, i=1, ..., k are defined as before.
Encrypt(mk, TM): The same as before.

Decrypt(T,$d_\sigma$,C): If $W_i \in \{W_1, \ldots, W_k\} \cap T$, the user computes $e(g^{q(a_i)} \cdot g_i, g^r)/e(g_i^r, g^r) = h^{r'q(a_i)}$. If $W_i \in \{W_1, \ldots, W_k\} \cap T$ has at least e elements, the user recovers $h^{r'S}$.

This variant improves on the efficiency of the general construction in that user storage is on the order of the number of attributes in σ (as opposed to the number of subformulas in σ).

Appendix D

Setup(λ, W, U, v): Say $W=\{w_1, \ldots, w_{2m}\}$ and $U=\{U, \ldots, U_n\}$. Let e: $G \times G \therefore G'$ be an admissible bilinear map between groups G and G'. Select a random generator $g \in G$ and let h=e(g,g). Select a random integer $S \in \{0, \ldots, |G|-1\}$. Select a random polynomial p of degree m+v such that p(0)=S. Define $g_i=g^{p(i)}$ for $1 \leq i \leq 2m$. Finally, choose a random value $u_i>2m$ for user $U_i$ such that $u_i \neq u_j$ for all $i \neq j$. The public parameters are (G,g,n,m,v), and the master key is $mk=(h,(g_1, \ldots, g_{2m}),(u_1, \ldots, u_n),p)$.

KeyGen(mk,$U_i$,σ): The key generation is exactly as described in Appendix B, except that we assign the secret value $g^{p(u_i)}$ to the root of the tree.

Encrypt(mk,M,T,R): Select $$r \xleftarrow{R} \{0, \ldots, |G|-1\}.$$

Compute $u=g^r$, $v_j=g_j^r$ for $w_j \in T$, $\mu_j=g^{rp(u_j)}$ for $U_j \in R$ and $w=h^{rS} \cdot M$.
Return $C=(u, \{v_j\}_{w_j \in T}, \{\mu_j\}_{U_j \in R}, w)$.
Decrypt(T,$d_{U_i}$,σ,C): Say $C=(g^r, \{V_i\}_{w_i \in T}, \{\mu_i\}U_{i \in R}, w)$.

Exactly as in the scheme described in Appendix B, user $U_i$ recovers the value $g^{rp(u_i)}$ associated with the root of the tree of the formula that describes $U_i$'s access rights. Provided C does not revoke user $U_i$, user $U_i$ now has m+v+1 values of the form $g^{rp(x)}$ for distinct values x. By polynomial interpolation, $U_i$ can compute $h^{rp(0)}=h^{rS}$ and recover $M=w \cdot h^{-rS}$.

What is claimed is:

1. A computer controlled method for generating one or more capability keys related to an unencrypted data unit comprising:

selecting one or more attributes from a list of attributes related to said unencrypted data unit;

using a computer, computing a key descriptor responsive to a selection of one or more access rights capable of being represented by a monotone boolean relationship between said one or more attributes;

generating one or more random numbers;

generating one or more shares responsive to said monotone boolean relationship and responsive to a master secret;

generating a unique capability key responsive to one or more cryptosystem parameters, said one or more shares and said one or more random numbers, wherein said unique capability key and said key descriptor together enable decryption of sensitive information within a selectively encrypted data unit created from the unencrypted data unit; and providing said unique capability key and said key descriptor wherein at least one of said one or more access rights is specified as a threshold relationship of said one or more attributes from a subset of said one or more attributes;

wherein the generating said one or more shares further comprises selecting a random polynomial of degree I−1 responsive to said master secret wherein said one or more shares can be represented as one or more respective points on said random polynomial;

wherein the threshold relationship is operative to reduce the number of shares and number of auxiliary values; and wherein I is the number of attributes in the threshold relationship.

2. The computer controlled method of claim 1, wherein generating said one or more shares comprises generating said one or more shares of said master secret responsive to said monotone boolean relationship.

3. The computer controlled method of claim 1, wherein generating said one or more shares comprises generating said one or more shares responsive to said monotone boolean relationship and a polynomial responsive to said master secret.

4. The computer controlled method of claim 3, wherein said polynomial is responsive to a number of possible users and a number of possible user revocations.

5. The computer controlled method of claim 1, wherein generating said one or more shares is further responsive to a specified user.

6. The computer controlled method of claim 1, wherein generating said unique capability key is also responsive to an access key and wherein the method further comprises preparing said access key and a protection key for delivery to a trusted third party.

7. The computer controlled method of claim 1, wherein said unencrypted data unit is one of a collection of data units, and said list of attributes is related to said collection of data units.

8. The computer controlled method of claim 1, wherein said one or more attributes categorize one or more of a group consisting of personally identifiable data, one or more restricted numbers, one or more restricted topics, one or more metadata values, one or more text characteristics, one or more identified ranges of restricted data, or one or more restricted images.

9. The computer controlled method of claim 1, further comprising generating a second unique capability key; and providing said second unique capability key.

10. An apparatus comprising:
a central processing unit (CPU),
a memory coupled to said CPU,
an attribute logic configured to select one or more attributes from a list of attributes related to said unencrypted data unit;
a key descriptor generation logic configured to compute a key descriptor responsive to a selection of one or more access rights capable of being represented by a monotone boolean relationship between said one or more attributes;
a random number generator configured to generate one or more random numbers;
a share generation logic configured to generate one or more shares responsive to said monotone boolean relationship and responsive to a master secret;
a key generation logic configured to generate a unique capability key responsive to one or more cryptosystem parameters, said one or more shares and said one or more random numbers, wherein said unique capability key and said key descriptor together enable decryption of sensitive information within a selectively encrypted data unit created from the unencrypted data unit; and
a provision logic configured to provide said unique capability key and said key descriptor wherein at least one of said one or more access rights is specified as a threshold relationship of said one or more attributes from a subset of said one or more attributes;

wherein the generating said one or more shares further comprises selecting a random polynomial of degree I−1 responsive to said master secret wherein said one or more shares can be represented as one or more respective points on said random polynomial;

wherein the threshold relationship is operative to reduce the number of shares and number of auxiliary values; and wherein I is the number of attributes in the threshold relationship.

11. The apparatus of claim 10, wherein the share generation logic is configured to generate said one or more shares of said master secret responsive to said monotone boolean relationship.

12. The apparatus of claim 10, wherein the share generation logic is configured to generate said monotone boolean relationship and a polynomial responsive to said master secret.

13. The apparatus of claim 12, wherein said polynomial is responsive to a number of possible users and a number of possible user revocations.

14. The apparatus of claim 10, wherein the share generation logic is further responsive to a specified user.

15. The apparatus of claim 10, wherein the key generation logic is also responsive to an access key and further comprises a key preparation logic configured to prepare said access key and a protection key for delivery to a trusted third party.

16. The apparatus of claim 10, wherein said unencrypted data unit is one of a collection of data units, and said list of attributes is related to said collection of data units.

17. The apparatus of claim 10, wherein said one or more attributes categorize one or more of a group consisting of personally identifiable data, one or more restricted numbers, one or more restricted topics, one or more metadata values, one or more text characteristics, one or more identified ranges of restricted data, or one or more restricted images.

18. A computer program product comprising:
a non-transitory computer-usable data carder providing instructions that, when executed by a computer, cause said computer to perform a method to generate one or more capability keys related to an unencrypted data unit, said method comprising:
selecting one or more attributes from a list of attributes related to said unencrypted data unit;
computing a key descriptor responsive to a selection of one or more access rights capable of being represented by a monotone boolean relationship between said one or more attributes;
generating one or more random numbers;
generating one or more shares responsive to said monotone boolean relationship and responsive to a master secret;
generating a unique capability key responsive to one or more cryptosystem parameters, said one or more shares and said one or more random numbers, wherein said unique capability key and said key descriptor together enable decryption of sensitive information within a selectively encrypted data unit created from the unencrypted data unit; and
providing said unique capability key and said key descriptor wherein at least one of said one or more access rights is specified as a threshold relationship of said one or more attributes from a subset of said one or more attributes;

wherein the generating said one or more shares further comprises selecting a random polynomial of degree I–1 responsive to said master secret wherein said one or more shares can be represented as one or more respective points on said random polynomial;

wherein the threshold relationship is operative to reduce the number of shares and number of auxiliary values; and wherein I is the number of attributes in the threshold relationship.

19. The computer program product of claim 18, wherein generating said one or more shares comprises generating said one or more shares of said master secret responsive to said monotone boolean relationship.

20. The computer program product of claim 18, wherein generating said one or more shares comprises generating said one or more shares responsive to said monotone boolean relationship and a polynomial responsive to said master secret.

21. The computer program product of claim 20, wherein said polynomial is responsive to a number of possible users and a number of possible user revocations.

22. The computer program product of claim 18, wherein generating said one or more shares is further responsive to a specified user.

23. The computer program product of claim 18, wherein generating said unique capability key is also responsive to an access key and wherein the product further comprises preparing said access key and a protection key for delivery to a trusted third party.

24. The computer program product of claim 18, wherein said unencrypted data unit is one of a collection of data units, and said list of attributes is related to said collection of data units.

25. The computer program product of claim 18, wherein said one or more attributes categorize one or more of a group consisting of personally identifiable data, one or more restricted numbers, one or more restricted topics, one or more metadata values, one or more text characteristics, one or more identified ranges of restricted data or one or more restricted images.

26. The computer program product of claim 18, further comprising generating a second unique capability key; and providing said second unique capability key.

* * * * *